(12) United States Patent
Wang

(10) Patent No.: US 9,411,168 B2
(45) Date of Patent: Aug. 9, 2016

(54) OPTICAL MODULE AND OPTICALLY FUNCTIONAL FILM APPLIED FOR OPTICAL DEVICE

(71) Applicants: Raymond Wang, Taichung (TW); RayShine Photonics Corp., Taichung (TW)

(72) Inventor: Raymond Wang, Taichung (TW)

(73) Assignees: Raymond Wang, Taichung (TW); RAYSHINE PHOTONICS CORP., Taichung (TW)

( * ) Notice: Subject to any disclaimer, the term of this patent is extended or adjusted under 35 U.S.C. 154(b) by 0 days.

(21) Appl. No.: 14/606,868

(22) Filed: Jan. 27, 2015

(65) Prior Publication Data

US 2015/0301352 A1 Oct. 22, 2015

(30) Foreign Application Priority Data

Apr. 21, 2014 (TW) .............................. 103114328 A

(51) Int. Cl.
*G02B 27/28* (2006.01)
*G02B 1/14* (2015.01)
*G02B 5/30* (2006.01)

(52) U.S. Cl.
CPC ................ *G02B 27/288* (2013.01); *G02B 1/14* (2015.01); *G02B 5/3016* (2013.01); *G02B 5/3041* (2013.01); *G02B 5/3083* (2013.01); *G02B 27/286* (2013.01)

(58) Field of Classification Search
CPC ...... G02B 1/14; G02B 5/3016; G02B 5/3041; G02B 5/3083; G02B 27/286; G02B 27/288
USPC ...................................................... 359/491.01
See application file for complete search history.

(56) References Cited

U.S. PATENT DOCUMENTS

| 9,250,473 | B2 * | 2/2016 | Kim ..................... G02F 1/13363 |
| 2004/0051445 | A1 * | 3/2004 | Adachi ................ G02B 5/3016 313/504 |
| 2005/0092965 | A1 * | 5/2005 | Ishizaki ................. C09K 19/38 252/299.01 |
| 2011/0085113 | A1 * | 4/2011 | Kim ...................... G02B 5/3083 349/96 |
| 2012/0002281 | A1 * | 1/2012 | Inoue ................... G02B 5/0226 359/486.01 |
| 2013/0249378 | A1 * | 9/2013 | Murakami ................. C08J 5/18 313/112 |
| 2013/0329288 | A1 * | 12/2013 | Yim .................... H01L 51/5281 359/483.01 |

* cited by examiner

*Primary Examiner* — Frank Font
(74) *Attorney, Agent, or Firm* — Muncy, Geissler, Olds & Lowe, P.C.

(57) ABSTRACT

An optical module includes a protection layer, an optically functional film, and an optical device. The optically functional film can make an external light transmit through it but cannot allow a reflection of the external light reflected by the optical device transmit through it, and the optically functional film can filter a blue ray of the external light.

16 Claims, 6 Drawing Sheets

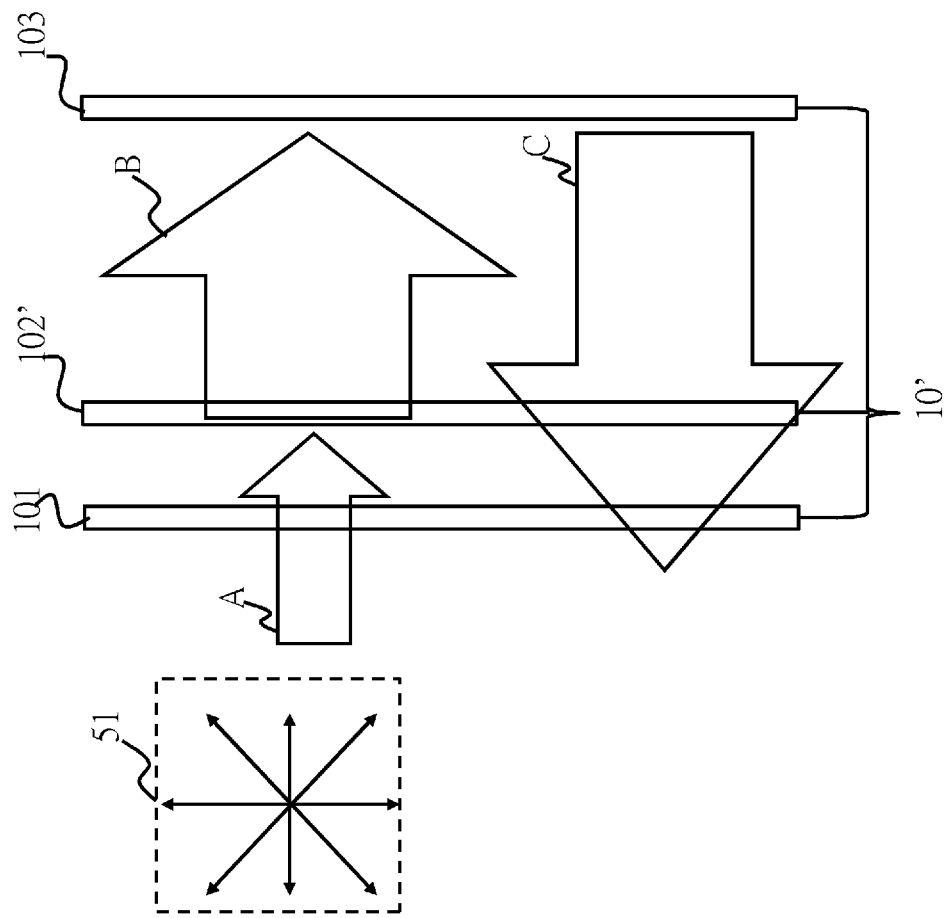

OPTICAL MODULE AND OPTICALLY FUNCTIONAL FILM APPLIED FOR OPTICAL DEVICE

FIELD OF THE INVENTION

The present invention relates to an optical module, and in particular to an optical module includes an optically functional film.

BACKGROUND OF THE INVENTION

Generally, an optical module can be divided into a display module and a lighting module. The display modules are commonly used as portable display, monitor, and automobile display, and the lighting modules have active and passive types. The top side of the display module is usually covered by a protection film to protect the glass of the display module from scratching and cracking. When a high intensity external light is incident to the display surface, the external light will be reflected and is received by users' eyes, so that users cannot clearly watch the image that showed in the display module. Hence, in order to enhance the comfortable of the user viewing, the reduction of the reflectivity of display module is needed to be solved. Furthermore, the light wavelength is outputted from the lighting modules which contains blue ray that is harmful to human eyes due to blue ray with high power, and therefore if human eyes contact the blue ray for a long time, human eyes will have macular degeneration. Another issue of reducing the blue ray is also needed to be solved.

Most methods for reducing the external light reflectivity are coating an anti-reflection film on the top side of the display module to increase the transmittance of the external light that incidents into the anti-reflection film, so that most external light can transmit through the anti-reflection film and incident into the display module. The anti-reflection mechanism focuses on the concentration ratio of the internal material of the deployment of the anti-reflection film and the coating types. Another anti-reflection mechanism is formed by coating the multilayer with different refractive indices that have destructive interference between the multilayers to reduce the reflectivity when the external light is transmitted to the anti-reflection film.

However, the anti-reflection film which is formed by coating depends on the coating fabrication parameters and material characteristic so as to the reflectivity of the anti-reflection film is not easy to control. On the other hand, the total reflectivity of the multi-layers is summed by the reflectivity of each layer of the multilayer, and if the total reflectivity of multilayer is decreased and the reflectivity of each layer of the multilayer is to be reduced. As a result, the manufacturing parameters and the material characteristics for each layer of the multilayer is to be controlled accurately, nevertheless, this controlling method is hard to reduce the total reflectivity due to the manufacturing parameters and the material characteristics of the anti-reflection film.

According to aforementioned, the reflected light and the blue ray are reduced that are the problems can be solved by the present invention.

SUMMARY OF THE INVENTION

In order to solve the aforementioned drawbacks, the major objective of the present invention is to provide an optical device that includes an optical device, an optically functional film, and a protection layer. The optical device has a panel, and an output light is transmitted from the optical device through the panel to outside of the optical device. The optically functional film has a first surface and a second surface that is attached to the panel. The protection layer is attached to the first surface of the optically functional film to protect the optically functional film. The first surface of the optically functional film allows an external light to transmit through, and the first surface of the optically functional film filters the blue ray of the external light. The filtered blue ray of the external light is converted into a first polarized light, and the first polarized light is converted by the second surface of the optically functional film into a second polarized light, in which a polarization direction of the second polarized light is different from that of the first polarized light. The first surface of the optically functionally film can filter the blue ray of the output light which is outputted from the panel and when the external light transmits through the optically functional film and is reflected from the panel and then propagates in optically functional film, a phase difference of $180°±2n\pi$ is to be obtained, where n is zero or a positive integer, and the reflected light of the second polarized light which is reflected by the panel cannot pass through the first surface of the optically functional film.

Another major objective of the present invention is to provide an optically functional film applied for an optical device which includes a blue ray filter, a linear polarizer, and a phase difference film. The blue ray filter has a front surface and a back surface, which is provided for filtering a blue ray of an external light to incident into a panel of the optical device, and for filtering a blue ray of an output light which is outputted from the panel. The linear polarizer has a front surface and a back surface, and the front surface is attached to the back surface of the blue ray filter for converting the external light into a first polarized light. The phase difference film has a front surface and a back surface, and the front surface is attached to the back surface of the linear polarizer for receiving the first polarized light to convert into a second polarized light, and the polarization direction of the second polarized light is different from that of the first polarized light. During the external light sequentially transmits through the blue ray filter, the linear polarizer, and the phase difference film, and then is reflected from the panel and transmitted through the phase difference film, a phase difference of $180°±2n\pi$ is to be generated, where n is zero or a positive integer. The reflected light of the second polarized light which is reflected by the panel cannot pass through the front surface of the blue ray filter.

Another major objective of the present invention is to provide an optically functional film applied for an optical device which includes a blue ray filter, a linear polarizer, a first phase difference film, and a second phase difference film. The blue ray filter has a front surface and a back surface, which is provided for filtering a blue ray of an external light to incident into a panel of the optical device, and for filtering a blue ray of an output light that is outputted from the panel. The linear polarizer has a front surface and a back surface, and the front surface is attached to the back surface of the blue ray filter for converting the external light into a first polarized light. The first phase difference film has a front surface and a back surface, and the front surface is attached to the back surface of the linear polarizer for receiving the first polarized light to convert into a second polarized light and the polarization direction of the second polarized light is different from that of the first polarized light. The second phase difference film has a front surface and a back surface, and the front surface is attached to the back surface of the first phase difference film for receiving the second polarized light to convert into a third polarized light. During the external light sequentially transmits through the blue ray filter, the linear polarizer, the first phase difference film, and the second phase difference film, and then the external light is reflected from the panel and sequentially transmits through the second phase difference film and the first phase difference film, a phase difference of $180°\pm2n\pi$ is to be generated, where n is zero or a positive integer. The reflected light of the third polarized light which is reflected by the panel cannot pass through the front surface of the blue ray filter.

Another major objective of the present invention is to provide an optical module which includes an optical device, an optically functional film, and a protection layer. The optical device is provided for outputting an output light. The optically functional film has a first surface and a second surface, and the second surface is attached to the optical device. The protection layer is attached to the first surface of the optically functional film to protect the optically functional film. The first surface of the optically functional film allows an external light to transmit through, and to filter a blue ray of the external light. The first surface also filters the outputted blue ray of the output light which is outputted from the optical device.

According to abovementioned, the optical module can reduce the reflectivity of the external light which incidents into the optical module and the optical module can further filter the blue ray which is harmful to human eye.

BRIEF DESCRIPTION OF THE DRAWINGS

The present invention will be apparent to those skilled in the art by reading the following description of a preferred embodiment thereof with reference to the drawings, in which:

FIG. 6 shows a schematic view of the optical module of an embodiment of second implementation in accordance with the present invention.

DETAILED DESCRIPTION OF THE PREFERRED EMBODIMENT

The present invention provides an optical module, the display function of the display module and lighting principle of the lighting device has been understood by who has knowledge of the relevant art with the related technologies. Thus, some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
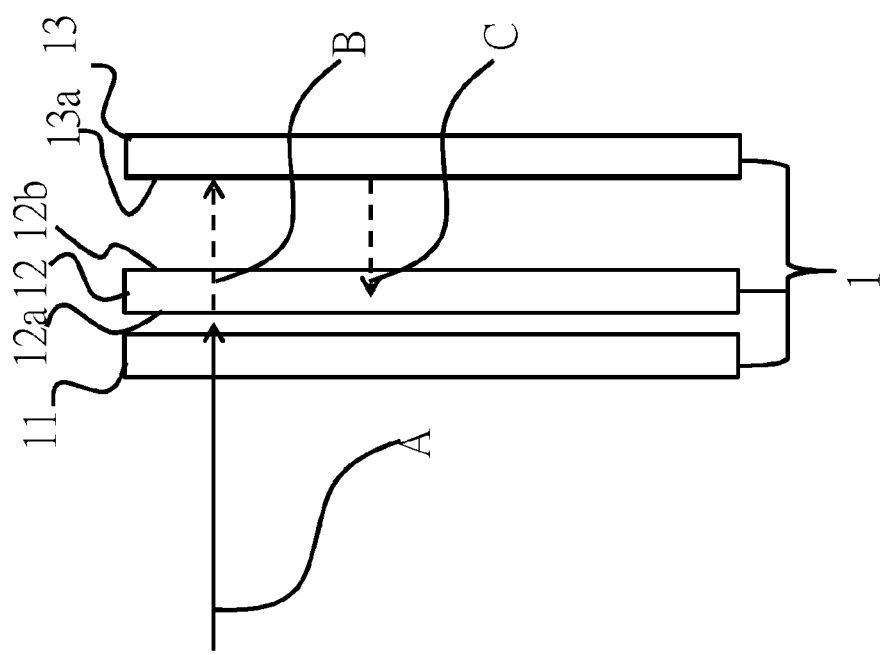
FIG. 1 shows a schematic view of the optical module of the first implementation in accordance with the present invention.

First, please refer to FIG. 1 which shows a schematic view of an optical module of the first implementation in accordance with the present invention.

As shown in FIG. 1, the optical module 1 includes a protection layer 11, an optically functional film 12, and an optical device 13. In this implementation of the present invention, the optical device 13 is a display device which includes a display-panel 13a, and the display device can be a liquid crystal display (LCD), a light emitting diode display (LED Display), or an organic light emitting diode display (OLED Display). The display device is described herein that can be a portable display, a monitor, and an automobile display. The portable display can be mobile phones, cameras, and tablet computers. The monitor can be televisions, computer screens, and laptop screens. The automobile display can be global positioning systems (GPS), dashboards, and event data recorders (EDR). The optically functional film 12 includes several films with polarization function that is attached and stacked on the display panel 13a of the optical device 13. The polarization function of the optically functional film 12 can generate a phase difference of $180°\pm2n\pi$ (n is zero or a positive integer) exists between the incident light and reflected light, in which the reflected light is the reflection of the output light which transmits through the optically functional film 12, so that the reflected light of the output light cannot pass through the optically functional film 12. The optically functional film 12 is composed by each film which can be a linear polarizer, a phase retarder, a hydrolysis stone or a liquid crystalline molecule. The phase retarders can be a full-wave plate, a half-wave plate, or a quarter-wave plate. The liquid crystal layer can be twisted-nematic (TN) type, in-plane switching (IPS) type, or a vertical alignment (VA) type. The protection layer 11 is attached and stacked on the optically functional film 12 to protect the optically functional film 12 from scratching and cracking, and the material of the protection layer 11 is a tempered glass with strong hardness or a material with scratch resistance and its anti-reflectivity is lower than 1% and the material of the protection film 12 is not limited herein.

Please also refer to FIG. 1. The external light is a nature light, such as sunlight that comes from outside of the optical module 1. The external light transmits along an external light propagation direction A and incidents through the protection film 11 to the optically functional film 12. The external light transmits to contact the first surface 12a of the optically functional film 12, and over 95% of the blue ray of the external light is to be filtered and the external light is then converted into a first polarized light (not shown in FIG. 1). Then, the first polarized light transmits along a first light propagation direction B to contact a second surface 12b of the optically functional film 12, and the first polarized light is converted into a second polarized light, in which the polarization direction of the second polarized light is different from that of the first polarized light.

Next, the second polarized light, which is outputted from the second surface 12b of the optically functional film 12, incidents into the optical device 13. The reflected light of the second polarized light is generated when the second polarized light incidents to the display panel 13a of the optical device 13 and then is reflected by the display panel 13a. The reflected light of the second polarized light propagates along a second light propagation direction C that is paralleled and opposite to the first light propagation direction B and incidents into the optically functional film 12 through the second surface 12b. It should be noted that the polarization direction of the reflected light of the second polarized light is different from that of the second polarized light.

Similarly, the second polarized light is converted into a third polarized light when the reflected light of the second polarized light is transmitted through the second surface 12b of the optically functional film 12, and the third polarized light cannot transmit through the first surface 12a of the optically functional film 12. In addition, the first surface 12a can further filter over 50% of the blue ray of the output light which comes from inside of the optical device 13 and outputs from the display panel 13a. It should be noted that a phase difference of 90°±nπ (n is zero or a positive integer) exists between the first polarized light and the second polarized light, and a phase difference of 180°±2nπ (n is zero or a positive integer) is to be generated when the external light transmits through the optically functional film 12 to the display panel 13a and is reflected by the display panel 13a, and then the reflected light which is reflected by the display panel 13a propagates to the optically functional film 12. In other words, the reflected light is reflected by the display panel 13a of the optical device 13 that is blocked by the optically functional film 12, so as to the reflected light cannot transmit through inside of the optically functional film 12. Thus, the reflectivity of the optically functional film 12 is close to zero, the reflectivity of the protection layer is lower than 1%, and the total reflectivity of the optical module 1 is less than 1% so as to achieve the anti-reflection. In this embodiment of the present invention, the optically functional film can increase the sharpness of the image when users watch the display panel.

Furthermore, the external light is a kind of a visible light with wavelength range of 380 nm~700 nm. The wavelength range contains ultraviolet blue ray (380 nm~475 nm), green ray (475 nm~530 nm), yellow ray (530 nm~590 nm), orange ray (590 nm~620 nm), and red ray (620 nm~700 nm). The power of the blue ray is so strong to make macular degeneration in human eyes while human eyes contact the blue ray for a long time. Therefore, the optically functional film 12 with anti-reflection function can filter over 95% of the blue ray of the external light which incidents into the optically functional film 12 and can further filter over 50% of the output light which is outputted from optical device 13. As a result, the optically functional film 12 equipped dual effect, such as increases the clarity of the display panel when the users watch the image and reduce harm produced by the blue ray to the human eye.

Figure 2:
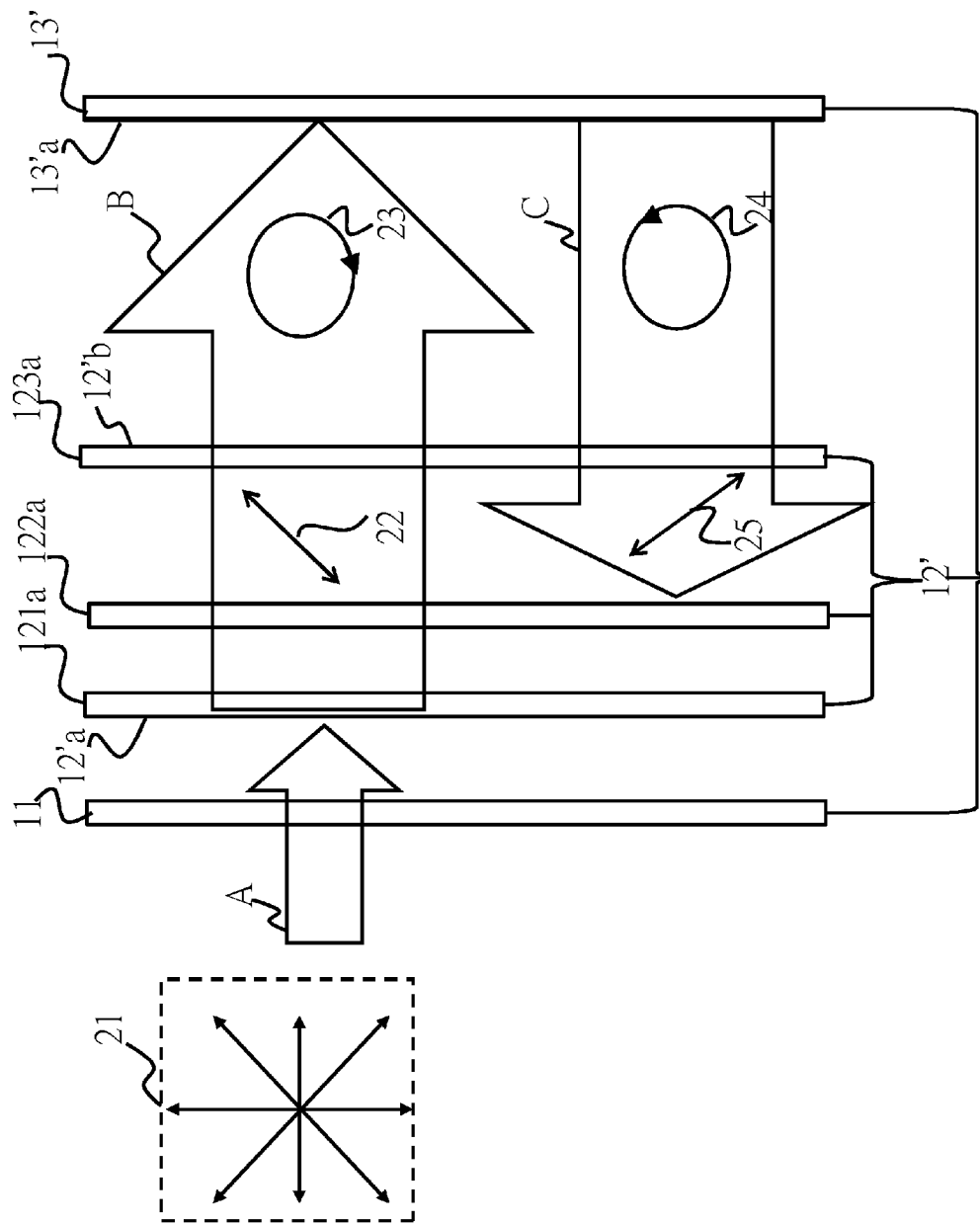
FIG. 2 shows a schematic view of the optical module of the first embodiment of the first implementation in accordance with the present invention.

Please refer to FIG. 2, which shows a schematic view of the optical module of the first embodiment of the first implementation in accordance with the present invention.

In this embodiment of the present invention, the optical module 1' includes a protection layer 11, an optically functional film 12', and a display device 13'. The protection layer 11 has a front surface and a back surface, and the optically functional film 12' has a first surface 12'a and a second surface 12'b, and the first surface 12'a of the optically functional film 12' is attached and stacked on the back surface of the protection film 11. The display device 13' includes a display panel 13'a which is attached to the second surface 12'b of the optically functional film 12', in which the display device 13' is used to display an image. The optically functional film 12' includes a blue ray filter 121a, a linear polarizer 122a, and a phase difference film 123a. The blue ray filter 121a has a front surface and a back surface. The linear polarizer 122a has a back surface and a front surface, and the front surface is attached to the back surface of the blue ray filter 121a. The phase difference film 123a has a back surface and a front surface, and the front surface is attached to the back surface of the linear polarizer 122a. In this embodiment of the present invention, the angle with ±45 degree disposed between the polarization direction of the linear polarizer 122a and the optic axis (not shown in FIG. 2).

Please still refer to FIG. 2. When an external light 21 transmits along the external light propagation direction A and incidents into the protection layer 11, lower than 1% of the external light 21 is to be reflected by the protection layer 11 and the external light incidents through the protection layer 11 to the blue ray filter 121a, and about 95% of the blue ray of the external light 21 is to be filtered. When the filtered external light 21 propagates through the linear polarizer 122a, the external light 21 is converted into a linear polarized light 22, and there is an angle with ±45 degree between the polarization direction of the linear polarized light 22 and optical axis (not shown in FIG. 2), and the polarization direction of the linear polarized light 22 is the same as that of the linear polarizer 122a. The linear polarized light 22 which incidents through the phase difference film 123a along a first light propagation direction B is converted into a right-handed circularly polarized light 23 which incidents into the display device 13' along the first light propagation direction B. In this embodiment of the present invention, the surface of the blue ray filter 121a disposed towards the external light 21 that is considered as the first surface 12'a of the optically functional film 12', and the surface of the phase difference film 123a disposed towards the display device 13' that is considered as the second surface 12'b of the optically functional film 12', in which the aforementioned first polarized light and second polarized light are the linear polarized light 22 and right-handed circularly polarized light 23, respectively.

Please also refer to FIG. 2. When the right-handed circularly polarized light 23 incidents into the display device 13', the right-handed circularly polarized light 23 is reflected by the display panel 13'a of the display device 13', in which the reflected light of the right-handed circularly polarized light 23 is the reflected light of the second polarized light as described aforementioned. In this embodiment, the reflected light of the right-handed circularly polarized light 23 is the left-handed circularly polarized light 24. The left-handed circularly polarized light 24 transmits along a second light propagation direction C and incidents into the phase difference film 123a to form a linear polarized light 25 which is the third polarized light as described aforementioned. There is an angle with ±45 degree between the polarization direction of the linear polarized light 25 and the optical axis (not shown in FIG. 2). The polarization direction of the linear polarized light 25 is perpendicular to that of the linear polarized light 22. After the linear polarized light 25 transmits along the second light propagation direction C and incidents into the liner polarizer 122a, the different polarization direction between the linear polarized light 25 and the linear polarizer 122a to cause the linear polarized light 25 that cannot pass through the linear polarizer 122a. Consequently, the phase difference of 90°±nπ (n is zero or a positive integer) exists between linear polarized light 22 and right-handed circularly polarized light 23, and the phase difference of 90°±nπ (n is zero or a positive integer) exists between the left-handed circularly polarized light 24 as the reflected light of the right-handed circularly polarized light 23 and linear polarized light 25. Thus, the phase difference of 180°±2nπ (n is 0 or a positive integer) is generated when the external light 21 sequentially transmits through the blue ray filter 121a, the linear polarizer 122a, and the phase difference film 123a, and then the external light 21 is reflected by the display panel 13'a of the display device 13' and transmits through the phase difference film 123a. The optically functional film 12' can permit the external light 21 to transmit through but cannot permit the reflected light of the external light 21 to transmit thereinto. The reflectivity of the optically functional film 12' is close to zero, the reflectivity of the protection layer 11 is less than 1%, and therefore the total reflectivity of the optical module 1' is less than 1% to achieve the capability of anti-reflection. In this embodiment, the optically functional film 12' can increase the clarity of the image showed by display panel 13'a. Furthermore, the first surface 12'a of the optically functional film 12' can further filter over 50% of the blue ray of the output light that is outputted from the display panel 13'a of the display device 13'.

In this embodiment of the present invention, the phase difference film 123a can be a liquid crystal layer or a phase retarder. The liquid crystal layer can be TN type, IPS type, or VA type, and the phase retarder can be a full-wave plate, a half-wave plate, or a quarter-wave plate.

In this embodiment of the present invention, the optically functional film 12' includes not only the anti-reflection function but also can filter over 95% of blue ray of the external light and over 50% of the blue ray of the output light that is outputted from the display device 13'. Thus, the optically functional film 12' can reduce harm produced by the blue ray to the human eye effectively.

Figure 3:
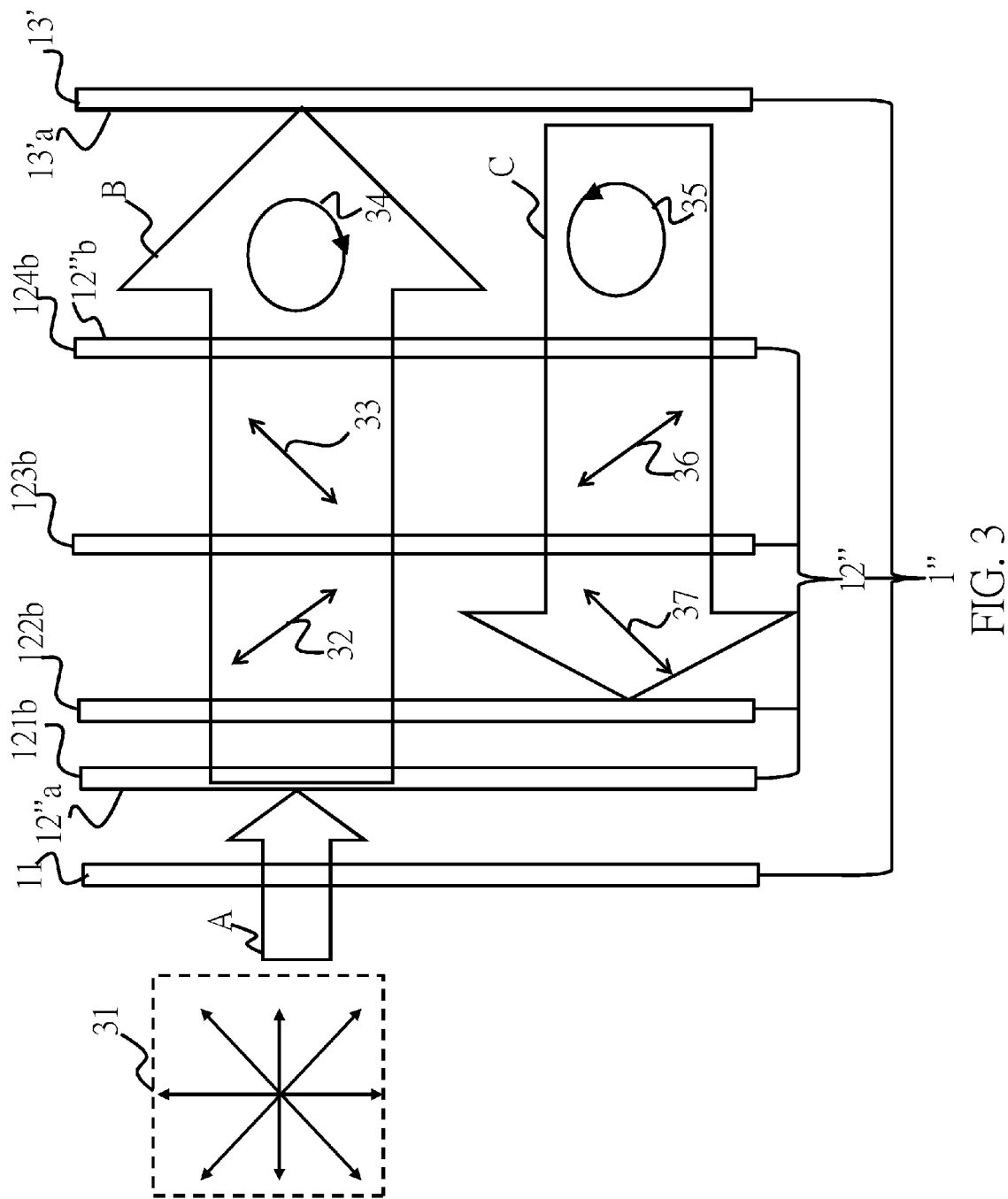
FIG. 3 shows a schematic view of the optical module of the second embodiment of the first implementation in accordance with the present invention.

Please refer to FIG. 3. FIG. 3 shows a schematic view of the optical module of the second embodiment of the first implementation in accordance with the present invention.

In this embodiment of the present invention, the optical module 1" includes a protection layer 11, an optically functional film 12", and a display device 13'. The protection layer 11 has a front surface and a back surface, the optically functional film 12" has a first surface 12"a and a second surface 12"b, and the first surface 12"a is attached on the back surface of the protection film 11. The display device 13' includes a display panel 13'a which is attached to the second surface 12"b of the optically functional film 12". The display device 13' is used to display an image. The optically functional film 12" includes a blue ray filter 121b, a linear polarizer 122b, a liquid crystal layer 123b and a phase retarder 124b. The blue ray filter 121b has a front surface and a back surface, and the linear polarizer 122b has a back surface and a front surface and the front surface of the linear polarizer 122b is attached to the back surface of the blue ray filter 121b. The liquid crystal layer 123b has a front surface and a back surface, and the front surface of the liquid crystal layer 123b is attached to the back surface of the linear polarizer 122b. The phase retarder 124b has a back surface and a front surface and the front surface is attached to the back surface of the liquid crystal layer 123b. In this embodiment of the present invention, the angle with ±45 degree disposed between the polarization direction of the linear polarizer 122b and the optical axis (not shown in FIG. 3).

Please still refer to FIG. 3. When an external light 31 transmits along the external light propagation direction A and incidents into the protection layer 11, lower than 1% of the external light is reflected by the protection layer 11. When the external light 31 transmits along the external light propagation direction A and incidents through the protection layer 11 to the blue ray filter 121b, over 95% of the blue ray of the external light 31 is to be filtered. When the filtered external light 31 incidents to the linear polarizer 122b, the filtered external light 31 is converted into a linear polarized light 32, and an angle with ±45 degree disposed between the polarization direction of the linear polarized light 32 and optical axis (not shown in FIG. 3), and the polarization direction of the linear polarized light 32 is the same as that of the linear polarizer 122b. The linear polarized light 32 incidents into the liquid crystal layer 123b along the first light propagation direction B and is converted by rotating the liquid molecular of the liquid crystal layer 123b into another linear polarized light 33, in which an angle with ±45 degree disposed between the polarization direction of the linear polarized light 33 and optical axis (not shown in FIG. 3) and the polarization direction of the linear polarized light 33 is perpendicular to that of the linear polarized light 32. When the linear polarized light 33 transmits along the first light propagation direction B through the phase retarder 124b, a right-handed circularly polarized light 34 is generated. The right-handed circularly polarized light 34 transmits along the first light propagation direction B and incidents into the display device 13'. In this embodiment of the present invention, the surface of the blue ray filter 121b disposed towards the external light 31 is considered as the first surface 12"a of the optically functional film 12", the surface of the phase retarder 124b disposed towards the display panel 13'a of the display device 13' is considered as the second surface 12"b of the optically functional film 12", and also the aforementioned first polarized light and second polarized light are the linear polarized light 32 and right-handed circularly polarized light 34, respectively.

Please also refer to FIG. 3. When the right-handed circularly polarized light 34 incidents into the display device 13', the display panel 13'a of the display device 13' reflects the right-handed circularly polarized light 34 to become a left-handed circularly polarized light 35, and the reflected light of the right-handed circularly polarized light 34 is the reflected light of the second polarized light as described mentioned. The reflected light of the right-handed circularly polarized light 34 is the left-handed circularly polarized light 35, and the left-handed circularly polarized light 35 transmits along a second light propagation direction C and incidents into the phase difference film 124b to form a linear polarized light 36. There is an angle with ±45 degree between the polarization direction of the linear polarized light 36 and the optical axis (not shown in FIG. 3). The polarization direction of the linear polarized light 36 is the same as that of the linear polarized light 32, and the polarization direction of the linear polarized light 36 is perpendicular to that of the linear polarized light 33. When the linear polarized light 36 transmits along the second light propagation direction C and incidents into the liquid crystal layer 123b to convert into a linear polarized 37, there is an angle with ±45 degree between the polarization direction of the linear polarized light 37 and that of the optical axis (not shown in FIG. 3). The polarization direction of the linear polarized light 37 is the same as that of the linear polarized light 33 and is perpendicular to that of the linear polarized light 36. Because the polarization direction of the linear polarized light 37 is perpendicular to the polarization direction of the linear polarizer 122b, the linear polarized light 37 cannot transmit through the linear polarizer 122b. Consequently, there is a phase difference of $90°\pm n\pi$ (n is zero or a positive integer) between the linear polarized light 32 and the right-handed circularly polarized light 34. The left-handed circularly polarized light 35 is the reflected light of the right-handed polarized light 34 and there is a phase difference $90°\pm n\pi$ (n is zero or a positive integer) between the left-handed circularly polarized light 35 and the linear polarized light 37. Thus, there is a phase difference of $180°\pm 2n\pi$ (n is zero or a positive integer) is generated during the external light sequentially propagates through the blue ray filter 121b, linear polarizer 122b, liquid crystal layer 123b and phase retarder 124b, and then the external light is reflected by the display panel 13'a of the display device 13' to sequentially transmits through the phase retarder 124b and the liquid crystal layer 123b. According to abovementioned, the optically functional film 12' can permit the external light 21 to transmit through but cannot permit the reflected light of the external light to reflect thereto. The reflectivity of the optically functional film 12" is close to zero, and the reflectivity of the protection layer 11 is less than 1%, such that the total reflectivity of the optical module 1" is less than 1% to achieve the capability of anti-reflection. In this embodiment, the optically functional film 12" can increase the clarity of the image display panel 13'a. Furthermore, the first surface 12"a of the optically functional film 12" can further filter over 50% of the blue ray of the output light that is outputted from the display panel 13'a of the display device 13'a.

In this embodiment of the present invention, the liquid crystal layer 123b can be TN type, IPS type, or VA type, and the liquid crystal layer 123b can be replaced by a phase retarder or any film with phase variation capability. The phase retarder 124b can be a full-wave plate, a half-wave plate, or a quarter-wave plate.

In this embodiment of the present invention, the optically functional film 12" includes not only the anti-reflection function, but also can filter over 95% of blue ray of the external light and over 50% of the blue ray of the output light which is outputted from the display device 13', so that the optically functional film 12" can reduce harm produced by the blue ray to the human eye effectively.

Figure 4:
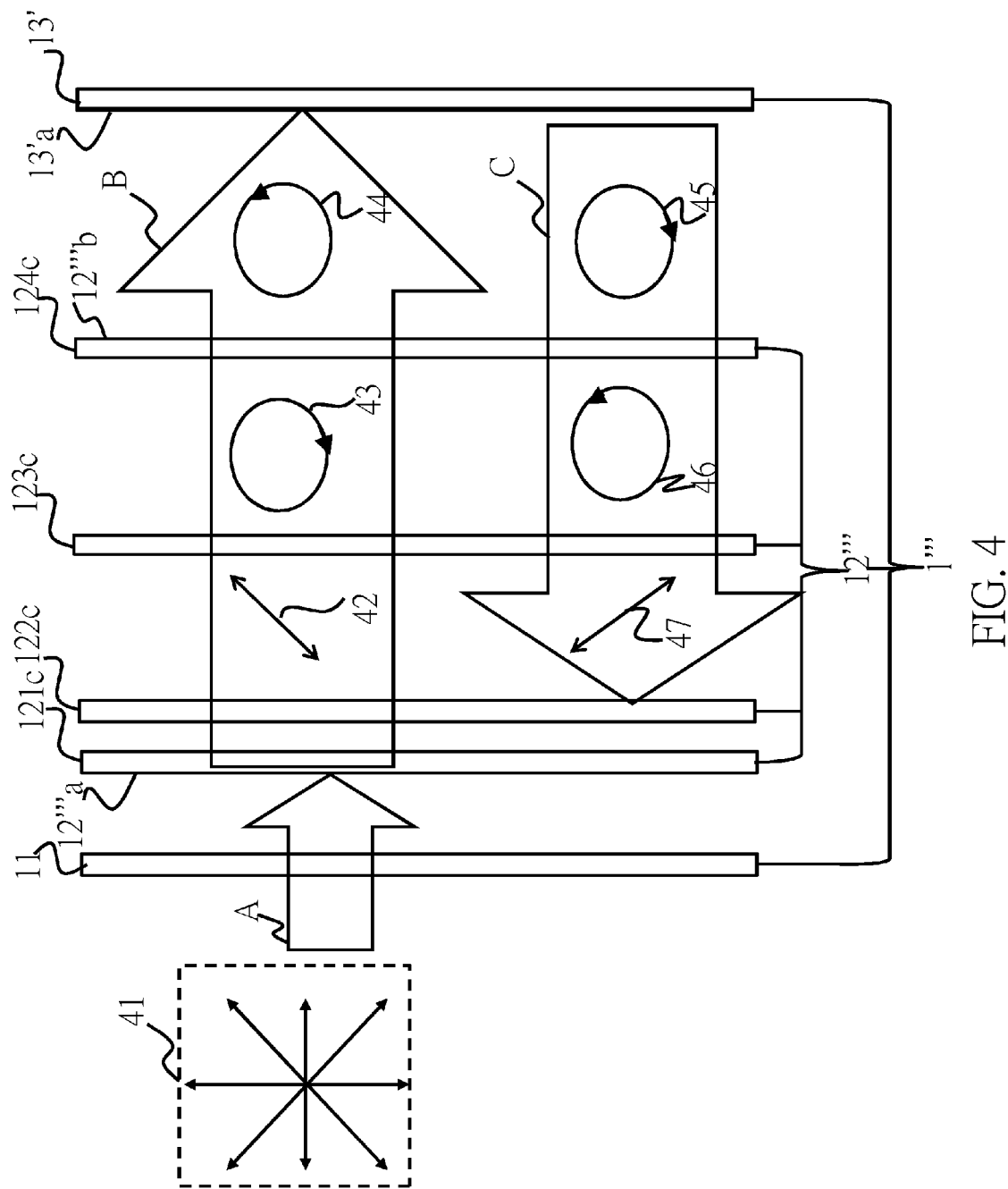
FIG. 4 shows a schematic view of the optical module of the third embodiment of the first implementation in accordance with the present invention.

Referring to FIG. 4. FIG. 4 shows a schematic view of the optical module of the third embodiment of the first implementation in accordance with the present invention.

In this embodiment of the present invention, the optical module 1' includes a protection layer 11, an optically functional film 12''' and a display device 13'. The protection layer 11 has a front surface and a back surface, the optically functional film 12''' has a first surface 12'''a and a second surface 12'''b and the first surface 12'''a is attached on the back surface of the protection film 11. The display device 13' includes a display panel 13'a that is attached to the second surface 12'''b of the optically functional film 12'. The display device 13' is used to display an image. The optically functional film 12''' includes a blue ray filter 121c, a linear polarizer 122c, a phase retarder 123c, and a liquid crystal layer 124c. The blue ray filter 121c has a front surface and a back surface, and the linear polarizer 122c has a back surface and a front surface and the front surface of the linear polarizer 122c is attached to the back surface of the blue ray filter 121c. The phase retarder 123c has a front surface and a back surface, and the front surface of the phase retarder 123c is attached to the back surface of the linear polarizer 122c. The liquid crystal layer 124c has a back surface and a front surface and the front surface is attached to the back surface of the phase retarder 123c. In this embodiment of the present invention, the angle with ±45 degree disposed between the polarization direction of the linear polarizer 122c and that of the optical axis (not shown in FIG. 4).

Please still refer to FIG. 4. When an external light 41 transmits along the external light propagation direction A and incidents into the protection layer 11, lower than 1% of the external light is reflected by the protection layer 11. When the external light 41 transmits along the external light propagation direction A and incidents into the blue ray filter 121c, and over 95% of the blue ray of the external light 41 is to be filtered. When the filtered external light 41 propagates through the linear polarizer 122c, the external light 41 is converted into a linear polarized light 42, there is an angle with ±45 degree between the polarization direction of the linear polarized light 42 and that of the optical axis (not shown in FIG. 4) and the polarization direction of the linear polarized light 42 is the same as that of the linear polarizer 122c. The linear polarized light 42 transmits along the first light propagation direction B and incidents through the phase retarder 123c to convert into a right-handed circularly polarized light 43. The right-handed circularly polarized light 43 transmits along the first light propagation direction B and passes through the liquid crystal layer 124c to generate a left-handed circularly polarized light 44. The left-handed circularly polarized light 44 transmits along the first light propagation direction B and incidents to the display panel 13'a of the display device 13'. In this embodiment of the present invention, the surface of the blue ray filter 121c disposed towards the external light 41 that is considered as the first surface 12'a of the optically functional film 12''', the surface of the liquid crystal layer 124c is disposed towards the display device 13' that is considered as the second surface 12'''b of the optically functional film 12''', and the aforementioned first polarized light and second polarized light are the linear polarized light 42 and left-handed circularly polarized light 44, respectively.

Please still refer to FIG. 4. When the left-handed circularly polarized light 44 incidents into the display panel 13'a of the display device 13', the left-handed circularly polarized light 44 is reflected by the display panel 13'a of the display device 13' to generate a reflected light and the reflected light of the left-handed circularly polarized light 44 is the reflected light of the second polarization light which is described as aforementioned. In this embodiment, the reflected light of the left-handed circularly polarized light 44 is the right-handed circularly polarized light 45, and the right-handed circularly polarized light 45 transmits along a second light propagation direction C and incidents into the liquid crystal layer 124c such that the left-handed circularly polarized light 46 is formed by rotating the liquid molecular of the liquid crystal layer 124c. When the left-handed circularly polarized light 46 transmits along the second light propagation direction C and incidents into the phase retarder 123c, the left-handed circularly polarized light 46 is converted into a linear polarized 47, and there is an angle with ±45 degree between the polarization direction of the linear polarized light 47 and that of the optical axis (not shown in FIG. 4). The polarization direction of the linear polarized light 47 is perpendicular to that of the linear polarized light 42, and the polarization direction of the linear polarized light 47 is also perpendicular to the polarization direction of the linear polarizer 122c such that the linear polarized light 47 cannot transmit through the linear polarizer 122c. Consequently, the phase difference of $90°\pm n\pi$ exists (n is zero or a positive integer) between linear polarized light 42 and left-handed circularly polarized light 44, and the phase difference of $90°\pm n\pi$ (n is zero or a positive integer) exists between the right-handed circularly polarized light 45 and the linear polarized light 47, in which the right-handed circularly polarized light 45 is the reflection of the left-handed circularly polarized light 44. Thus, the phase difference of $180°\pm 2n\pi$ (n is zero or a positive integer) is to be generated during the external light 41 sequentially propagates through the blue ray filter 121c, the linear polarizer 122c, the phase retarder 123c, and the liquid crystal layer 124c, and then the external light 41 is reflected by the display panel 13'a of the display device 13' and sequentially transmits through the liquid crystal layer 124c and the phase retarder 123c. According to abovementioned, the optically functional film 12''' can permit the external light 41 to transmit through but cannot permit the reflected light of the external light 41 to reflect thereto. The reflectivity of the optically functional film 12''' is close to zero, and the reflectivity of the protection layer 11 is less than 1%, such that the total reflectivity of the optical module 1''' is less than 1% to achieve the capability of anti-reflection. In this embodiment, the optically functional film 12''' can increase the clarity of the image displayed by the display panel 13'a. Furthermore, the first surface 12'''a of the optically functional film 12''' can filter over 50% of the blue ray of the output light that is outputted from the display panel 13'a of the display device 13'.

In this embodiment of the present invention, the liquid crystal layer 124c is a phase difference film which can be TN type, IPS type, or VA type, and the liquid crystal layer 124c can be replaced by a phase retarder or any film with phase variation capability. The phase retarder 123c can be a full-wave plate, a half-wave plate, or a quarter-wave plate.

In this embodiment of the present invention, the optically functional film 12''' includes not only the anti-reflection function, but also can filter over 95% of blue ray of the external light and over 50% of the blue ray of the output light that is outputted from the display device 13', so that the optically functional film 12''' can reduce harm which is produced by the blue ray to the human effectively.

Figure 5:
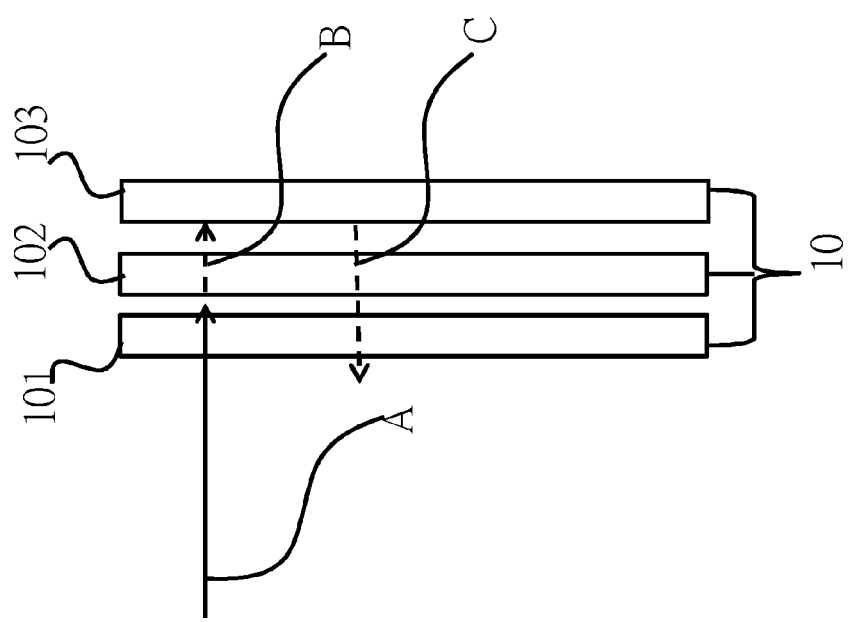
FIG. 5 shows a schematic view of the optical module of the second implementation in accordance with the present invention.

Referring to FIG. 5. FIG. 5 shows a schematic view of the optical module of the second implementation in accordance with the present invention.

As shown in FIG. 5, the optical module 10 includes a protection layer 101, an optically functional film 102, and an optical device 103. In this implementation of the present invention, the optical device 103 is a display device or a lighting device. The display device can be a liquid crystal display (LCD), a light emitting diode display (LED Display), or an organic light emitting diode display (OLED Display). The display device described herein that can be a portable display, a monitor, and an automobile display. The portable display can be mobile phones, cameras, and tablet computers. The monitor can be televisions, computer screens, and laptop screens. The automobile display can be global positioning systems (GPS), dashboards, and event data recorders (EDR). The lighting device is a device capable of lighting, such as a light emitting diode (LED) or a cold cathode fluorescent lamp (CCFL). The optically functional film 102 is attached and stacked on the optical device 103, and the optically functional film 102 is a blue ray filter for filtering over 95% of the blue ray of the external light. The protection layer 101 is attached and stacked on the optically functional film 102 to protect the optically functional film 102 from scratching and cracking. The material of the protection layer 101 is not limited to a kind of a tempered glass with strong hardness or a material with scratch resistance and the anti-reflectivity is lower than 1%.

Please continue to refer to FIG. 5. The external light is a nature light, such as sunlight that comes from outside of the optical module 10. The external light transmits along an external light propagation direction A and incidents through the protection film 101 to the optically functional film 102. The external light transmitted to contact the front surface of the optically functional film 102, and a part of the blue ray of the external light is to be filtered. Then, the filtered external light transmits along a first light propagation direction B to the optical device 103. The optical device 103 reflects the filtered external light and the reflected light of the filtered external light propagates through along a second light propagation direction C to the optically functional film 102. When the external light passes through the optically functional film 102 and then is reflected by the optical device 103, the reflected external light transmits through the optically functional film 102, over 95% of the external light is to be filtered. At the same time, the optically functional film 102 can further filter over 50% of the blue ray of the output light that is outputted from the optical device 103. In this embodiment of the present invention, the optically functional film 102 is capable of reducing harm of blue ray to human eye.

Please refer to FIG. 6 which shows a schematic view of the optical module of the embodiment of the second implementation in accordance with the present invention.

In this embodiment of the present invention, the optical module 10' includes a protection layer 101, an optically functional film 102', and a display device 103. The protection layer 101 has a front surface and a back surface, and the optically functional film 102' is used as a blue ray filter which has a front surface and a back surface, in which the front surface of the optically functional film 102' is attached to the back surface of the protection film 101, and the back surface of the optically functional film 102' is attached to the optical device 103. In this embodiment, the display device 103 is used as a display device or a lighting device. The protection layer 101 is used to protect the optically functional film 102' from scratching and cracking, and the material of the protection layer 101 is not limited to a kind of a tempered glass with strong hardness or a material with scratch resistance and the anti-reflectivity of the protection layer 101 is lower than 1%.

Please still refer to FIG. 6. When the external light 51 transmits along an external light propagation direction A and incidents into the protection film 101, the protection layer 101 can reflect less than 1% of incident light. When the external light 51 transmits along the external light propagation direction A and incidents to the front surface of the optically functional film 102', parts of the blue ray of the external light is to be filtered. When the filtered external light 51 transmits along a first light propagation direction B to contact the optical device 103. The optical device 103 reflects the filtered external light 51 and the reflected light of the external light 51 transmits along the second light propagation direction C and transmits through the optically functional film 102'. At the same time, the blue ray of the external light 51 is filtered again. In this embodiment of the present invention, over 95% of blue ray of the external light is filtered by the optically functional film 102' during the external light transmits through the optically functional film 102' and is reflected by the optical device 103, and then the reflected light transmits through the optically functional film 102'. Besides, the optically functional film 102' can further filter over 50% of the blue ray of the output light which is outputted from the optical device 103.

In this embodiment of the present invention, the optically functional film 102' can filter over 95% of blue ray of the external light and over 50% of the blue ray of the output light that is outputted from the display device 103, so that the optically functional film 102' can reduce harm to the human eye by the blue ray effectively.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An optical module, comprising:
   an optical device, having a panel, and an output light is transmitted from the optical device through the panel to outside of the optical device;
   an optically functional film, which has a first surface and a second surface that is attached to the panel;
   a protection layer, which is attached to the first surface of the optically functional film to protect the optically functional film;
   wherein the first surface of the optically functional film allows filtration of a blue ray of the external light, and the second surface of the optically functional film allows production of a phase difference of the external light.

2. The optical module of claim 1, wherein the optical device is a display device.

3. The optical module of claim 2, wherein the display device is a liquid crystal display, a light emitting diode display, or an organic light emitting diode display.

4. The optical module of claim 1, wherein the optically functional film comprises a film with polarized function, and the optically functional film is a polarizer, a phase retarder, or a liquid crystal layer.

5. An optically functional film applied for an optical device, comprising:
- a blue ray filter, having a front surface and a back surface, which is provided for filtering a blue ray of an external light which incidents to a panel of the optical device, and to filter the blue ray of an output light which is outputted from the panel;
- a linear polarizer, having a front surface and a back surface wherein the front surface is attached to the back surface of the blue ray filter which is provided for converting the external light into a first polarized light; and
- a phase difference film, having a front surface and a back surface wherein the front surface is attached to the back surface of the linear polarizer which is provided for receiving the first polarized light to convert into a second polarized light, wherein the polarization direction of the second polarized light is different from that of the first polarized light,
- wherein a phase difference of $180°\pm2n\pi$ is to be generated during the external light sequentially transmits through the blue ray filter, the linear polarizer, and the phase difference film, and then is reflected from the panel and transmitted through the phase difference film, where n is zero or a positive integer, and the reflected light of the second polarized light which is reflected by the panel cannot pass through the front surface of the blue ray filter.

6. The optically functional film applied for the optical device of claim 5, wherein the phase difference film is a phase retarder or a liquid crystal layer.

7. The optically functional film of claim 6, wherein the phase retarder is a full-wave plate, a half-wave plate, or a quarter-wave plate.

8. The optically functional film of claim 6, wherein the liquid crystal layer is a twist-nematic (TN) type, an in-plane switching (IPS) type, or a vertical alignment (VA) type.

9. An optically functional film applied for an optical device, comprising:
- a blue ray filter, having a front surface and a back surface, which is provided for filtering a blue ray of an external light incidents to a panel of the optical device, and to filter the blue ray of an output light outputted from the panel;
- a linear polarizer, having a front surface and a back surface wherein the front surface is attached to the back surface of the blue ray filter, and the linear polarizer is provided for converting the external light into a first polarized light;
- a first phase difference film, having a front surface and a back surface wherein the front surface is attached to the back surface of the linear polarizer, and the first difference film is provided for receiving the first polarized light to convert into a second polarized light wherein the polarization direction of the second polarized light is different from that of the first polarized light;
- a second phase difference film, having a front surface and a back surface wherein the front surface is attached to the back surface of the first phase difference film, which is provided for receiving the second polarized light to convert into a third polarized light,
- wherein a phase difference of $180°\pm2n\pi$ is to be generated during the external light sequentially transmits through the blue ray filter, the linear polarizer, the first phase difference film, and the second phase difference film, and is reflected from the panel and then sequentially transmits through the second phase difference film and the first phase difference film, where n is zero or a positive integer, and the reflected light of the third polarized light that is reflected by the panel cannot pass through the front surface of the blue ray filter.

10. The optically functional film applied for optical device of claim 9, wherein the first phase difference film is a liquid crystal layer or a phase retarder.

11. The optically functional film applied for optical device of claim 10, wherein the phase retarder is a full-wave plate, a half-wave plate, or a quarter-wave plate.

12. The optically functional film applied for optical device of claim 10, wherein the liquid crystal layer is a twist-nematic (TN) type, an in-plane switching (IPS) type, or a vertical alignment (VA) type.

13. An optical module, comprising:
- an optical device, which is provided for outputting an output light;
- an optically functional film, which has a first surface and a second surface, and the second surface is attached to the optical device;
- a protection layer, which is attached to the first surface of the optically functional film to protect the optically functional film,
- wherein the first surface of the optically functional film allows an external light to transmit through and to filter a blue ray of the external light and the first surface also filters the blue ray of the output light which is outputted from the optical device.

14. The optical module of claim 13, wherein the display device is a display device or a lighting device.

15. The optical module of claim 14, wherein the display module is a liquid crystal display, a light emitting diode display, or an organic light emitting diode display.

16. The optical module of claim 14, wherein the lighting device is a light emitting diode or a cold cathode fluorescent lamp.

* * * * *